Figure 3:
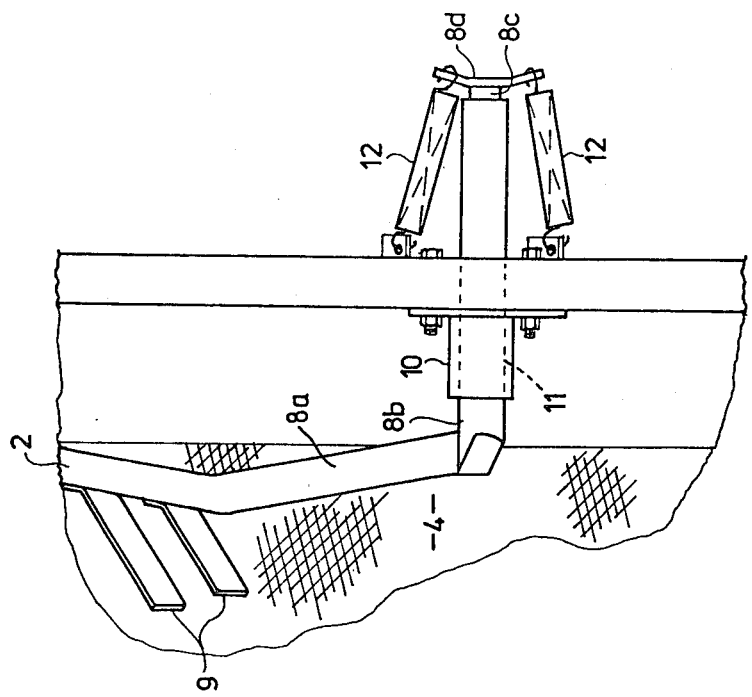

United States Patent [19]

James

[11] 4,342,285
[45] Aug. 3, 1982

[54] ANIMAL TREATMENT TUNNELS OR RACES

[76] Inventor: Ian W. James, 50 Hemans St., Cambridge, New Zealand

[21] Appl. No.: 201,476

[22] Filed: Oct. 28, 1980

[51] Int. Cl.³ .............................................. A01K 29/00
[52] U.S. Cl. ..................................... 119/155; 119/159
[58] Field of Search ............... 119/156, 158, 159, 160, 119/98, 99, 103, 155

[56] References Cited

U.S. PATENT DOCUMENTS 1,260,339 3/1918 Crockenberger .................... 119/156
4,026,069 5/1977 Bohnett ............................ 119/155 X Primary Examiner—Hugh R. Chamblee
Attorney, Agent, or Firm—Holman & Stern

[57] ABSTRACT

The invention is concerned with the provision of guide apparatus for incorporation in an animal tunnel or race, particularly an animal treatment tunnel or race in which animals such as sheep can be treated by spraying with a treatment liquid, the guide apparatus including a pair of guiderails arranged to be located one each side of the tunnel or race adjacent an inner wall, and the guiderails are each provided with a plurality of fingers or fenders preferably of a resilient material and projecting inwardly of the tunnel or race so that the inner free ends of the fenders define a restricted path for the animals passing therethrough to maintain the animals clear of the tunnel or race walls and any spray or like equipment thereon.

8 Claims, 3 Drawing Figures

ANIMAL TREATMENT TUNNELS OR RACES

This invention relates to animal tunnels or races and particularly to animal treatment tunnels or races where animals e.g. sheep, are treated such as by a liquid spraying system as they pass through the tunnel or race. Such tunnels or races generally comprise an enclosure with two open ends, a footwalk lengthwise thereof and spray means operable to disperse treatment solution onto an animal's body as it passes through the tunnel or race.

To ensure that each animal passing through the tunnel or race is adequately treated it is desirable that means be provided for centralizing the animal relative to a spraying pattern within the tunnel or race.

It is an object of the present invention to provide a guide apparatus for an animal treatment tunnel or race as aforesaid, which will ensure that animals passing through the tunnel or race are correctly positioned to receive maximum benefit from spraying patterns of treatment solutions sprayed within the tunnel or race.

Many animals, and sheep in particular, are timid and when faced with the prospect of being forced to move in a direction or towards an area which may be unusual or in any way unpleasant, they are likely to become extremely agitated and endeavour to escape or retreat in their desire to reach safer or more familiar ground. This situation applies when sheep and some other animals are treated in tunnels or races of the kind described, and it is highly likely that animals passing through a tunnel or race will be in collision with the walls and/or spray equipment thereof due to their agitated state. The guide apparatus of the present invention is designed to prevent damage to the walls and any projecting spray equipment or other parts of a tunnel or race as the animals pass therethrough. Further the guide apparatus is designed to prevent animals reversing in the tunnel or race.

Thus it is a further object of the present invention to provide a guide apparatus for a sheep tunnel or race as aforesaid which is capable of absorbing energy on impact.

According to a first aspect of the present invention there is provided a guide apparatus for an animal tunnel or race, said guide apparatus comprising at least two guiderails one for each side of the tunnel or race, each of said guiderails being mountable with respect to opposite inner side walls of a tunnel or race so as to extend lengthwise thereof and having a plurality of projecting fenders extending outwardly therefrom inwardly of the tunnel or race, the ends of said fenders defining a central passage within the tunnel or race which animals passing through must negotiate.

According to a second aspect of the present invention there is provided a guide apparatus for an animal tunnel or race of the type described, said guide apparatus comprising at least two guiderails arranged lengthwise of the race, one for each side of the tunnel or race, each of said guiderails being mountable with respect to opposite inner side walls of the tunnel or race and having at least one resilient mounting wherein said at least one resilient mounting is arranged to absorb energy in the event that an animal collides with a guiderail and thereafter return the guiderail to its original position.

The invention also includes an animal treatment tunnel or race incorporating the guide apparatus according to any one of the two preceding claims.

Figure 1:
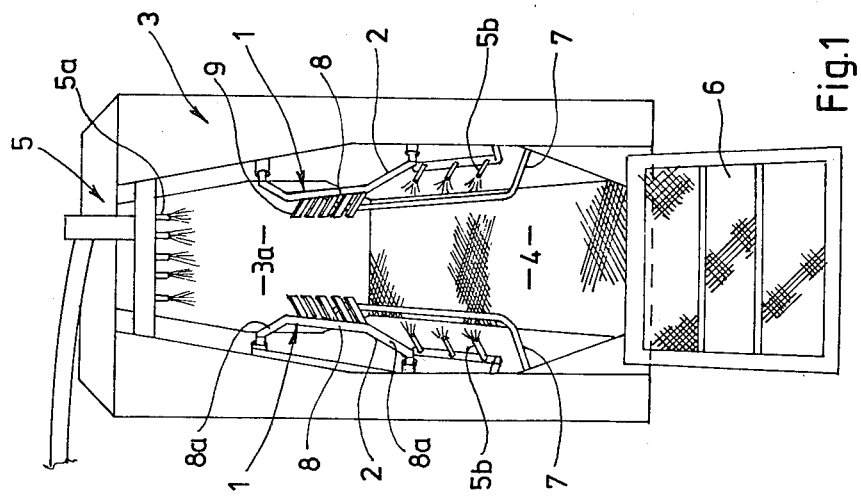
Figure 2:
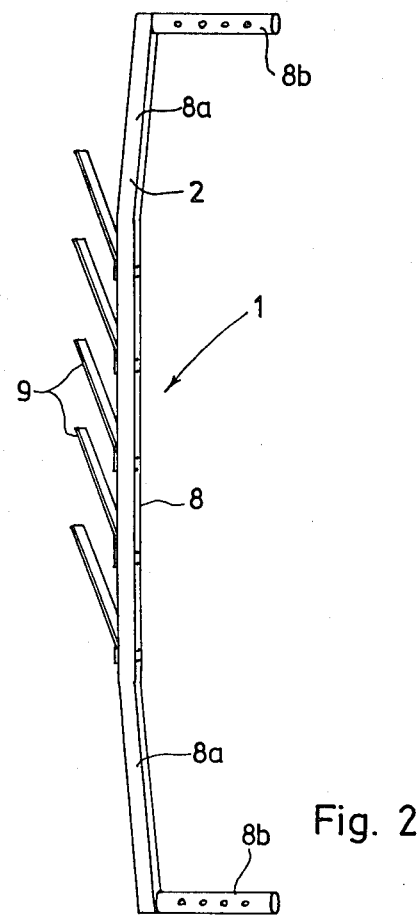

Embodiments of the present invention will now be described by way of example with reference to the accompanying drawings in which:

FIG. 1 is a front perspective view of a typical tunnel or race to which the present invention relates, having guiderails incorporated therein, and FIG. 2 is a side view of a guiderail in accordance with one embodiment of the present invention, and FIG. 3 is a perspective view at one end of a guiderail for an animal treatment tunnel or race showing its end mounted in a resilient mounting.

With reference to FIG. 1 of the drawings, a guide apparatus indicated by arrow 1 can comprise a pair of elongate guiderails 2 mounted lengthwise of a spraying tunnel or race which is generally indicated by arrow 3.

The tunnel or race 3 is provided with open ends and a footwalk 4 lengthwise thereof and spraying means generally indicated by arrow 5, which may include top spraying nozzles 5a and sets of side and underside spraying nozzles 5b are positioned at the sides and top of the tunnel or race. The tunnel or race can be provided with lower guiderails 7 which are positioned beneath the guiderails 2 such being designed to encourage a correct foot position for an animal passing through the tunnel or race 3.

In the particular example of a tunnel or race illustrated by FIG. 1 of the drawings, an animal enters the tunnel via an on ramp 6 and leaves through an opposite end of the tunnel or race 3.

In tunnels or races of this type it has been found that it is particularly desirable not only to encourage a correct foot position for an animal passing through the tunnel or race but also to encourage correct body positions and the guide apparatus 1 of the present invention achieves this.

One embodiment of a guiderail 2 in accordance with the present invention is illustrated by FIG. 2 of the drawings. Guiderails 2 may comprise a straight central portion having similarly diverted ends 8a integral with extending engaging portion 8b disposed on a plane substantially perpendicular to the longitudinal axis of the straight central portion. The straight portion of the guiderails 2 are provided with a plurality of extending fenders 9 which are inclined relative to the longitudinal axis of the straight portion 8 and pointing towards the exit 3a of the tunnel or race.

With reference to FIG. 3, the extending portions 8b of the guiderails are arranged to engage in sockets 10 at each end of the inner walls of the tunnel or race and, depending upon the animal to be treated, the depth at which the engaging portions lie in the sockets in the walls of the tunnel or race is chosen and the engaging members locked with a pin or other means in selected positions in the sockets.

When the guiderails 2 are mounted within the tunnel as illustrated by FIG. 1 of the drawings, the extending ends of the fenders 9 define a centre position within the tunnel or race which animals passing through the tunnel or race must negotiate. As is shown in the drawings the guiderails are mounted such that their fenders are inclined towards an exit 3a from the tunnel or race 3.

The fenders 9 may be fabricated from a resilient spring steel or plastic material which is capable of absorbing impact by bending in the event that an animal collides with the fenders, and thereafter returning to their original conditions.

Sections 8 and 8a of the guiderails 2 can be fabricated from rectangular steel tubing whilst the engaging portions 8b can be of a circular crosssection.

The guiderails 2 may each be provided with at least one resilient mounting an emodiment of which is illustrated by FIG. 3 of the drawings. Such mountings include the socket 10 fixed to the side walls of the tunnel or race over an aperture 11 in which the engaging portions 8b of the ends of the guiderails are fitted such that at least an end portion 8c thereof extends outward of the side walls of the tunnel or race. The engaging portions 8b are free to move longitudinally to and fro in the socket 10. The ends 8c of the portions 8b are provided with a cross member 8d to which can be fitted energy absorbing resilient members 12 mounted back to the wall of the tunnel or race, the arrangement being such that when an animal is in collision with a side rail of the tunnel or race the energy of impact is absorbed by the resilient members 12. In the embodiment illustrated the resilient members are coil springs, however it should be appreciated that other forms thereof may be provided. For example a single coil spring may be placed on the extending end portion 8c of the engaging portions between the cross member 8d or an equivalent to this member in the wall of the tunnel or race.

It should be appreciated that the resilient mountings in accordance with the present invention may be incorporated into any existing apparatus and further that such mountings may be used and incorporated in new or existing treatment apparatus for sheep or for other animals.

It should also be appreciated that whilst in the preferred arrangement both ends of the guiderails are mounted in resilient mountings, one end of the guiderails may be pivotably mounted (not shown) such an arrangement being within the scope of the present invention.

Aspects of the present invention have been described by way of example and it will be appreciated that other forms thereof may be provided without departing from the scope of the invention as defined in the appended claims.

I claim:

1. Guide apparatus for an animal tunnel or race, said guide apparatus comprising at least two guiderails, one for each side of the tunnel or race, each of said guiderails being mountable with respect to opposite side walls of a tunnel or race so as to extend inward and lengthwise thereof and having a plurality of projecting fenders extending therefrom inwardly of the tunnel or race, the ends of said fenders being directed toward the exit from the tunnel or race and defining a central passage within the tunnel or race which animals passing through must negotiate; said fenders being fixedly and non-rotatably mounted and of sufficient strength and resiliency to deter the animals from colliding with the walls of the race and to prevent the animals from reversing direction within the race.

2. Guide apparatus as claimed in claim 1, wherein the fenders are fabricated from resilient material.

3. Guide apparatus as claimed in claim 2, wherein the fenders are fabricated from spring steel.

4. Guide apparatus as claimed in any one of claims 2, or 3, wherein each of said guiderails comprises an elongate central portion to which the plurality of fenders are mounted, said guiderails having end portions directed outwardly towards the respective tunnel or race walls to be disposed in a plane substantially perpendicular to the longitudinal axis of said central portions, said end portions being arranged to be fixed relative to the sides of the tunnel or race.

5. Guide apparatus as claimed in claim 4, wherein the end portions of the guiderails are arranged to engage adjustably with sockets in the side walls of the tunnel or race, such that, depending on the size of animal to be treated, spacings between the guiderails are adjustable at the sockets.

6. Guide apparatus as claimed in any one of claims 1, 2, or 3 wherein said guiderails are mountable with respect to the opposite side walls of the tunnel or race by means of at least one resilient mounting wherein said mounting is arranged to absorb energy in the event that an animal collides with a guiderail and thereafter to return its guiderail to its original position.

7. A guide apparatus as claimed in claim 6, wherein each of said resilient mountings comprises a socket associated with a side wall of the tunnel or race arranged to receive an end or extending portion of the respective guiderail directed towards and through the respective socket such that said extending portion of the guiderail is able to move longitudinally in the socket and has the free end thereof extending outwardly from the respective wall of the tunnel or race, there being at least one energy absorbing resilient member disposed between the free end of the extending portion of the guiderail and the wall of the tunnel or race, the energy absorbing resilient member being arranged to absorb energy of impact in the event that an animal collides with a guiderail as it passes through the race.

8. A guide apparatus as claimed in claim 7, wherein said energy absorbing resilient member is a coil spring.

* * * * *